US011095030B2

(12) United States Patent
Puleri et al.

(10) Patent No.: US 11,095,030 B2
(45) Date of Patent: Aug. 17, 2021

(54) RECEIVER FOR A PHASED ARRAY ANTENNA

(71) Applicant: Telefonaktiebolaget LM Ericsson (publ), Stockholm (SE)

(72) Inventors: Marzio Puleri, Pisa (IT); Antonella Bogoni, Pisa (IT); Antonio D'Errico, Pisa (IT); Paolo Ghelfi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 15/556,782

(22) PCT Filed: Mar. 12, 2015

(86) PCT No.: PCT/EP2015/055236
§ 371 (c)(1),
(2) Date: Sep. 8, 2017

(87) PCT Pub. No.: WO2016/142000
PCT Pub. Date: Sep. 15, 2016

(65) Prior Publication Data
US 2018/0062261 A1 Mar. 1, 2018

(51) Int. Cl.
*H01Q 3/26* (2006.01)
*H04B 10/2575* (2013.01)

(52) U.S. Cl.
CPC ..... *H01Q 3/2676* (2013.01); *H04B 10/25759* (2013.01); *H04B 2210/006* (2013.01)

(58) Field of Classification Search
CPC ............ H01Q 3/2676; H04B 10/25759; H04B 2210/006; G02B 6/29338
See application file for complete search history.

(56) References Cited

U.S. PATENT DOCUMENTS 4,775,214 A * 10/1988 Johnson ............. G02B 6/29338
385/12
6,320,539 B1 * 11/2001 Matthews ............ H01Q 3/2676
342/375
(Continued)

FOREIGN PATENT DOCUMENTS

WO 2013117216 A1 8/2013

OTHER PUBLICATIONS

T. Kawanishi et al., Optical frequency comb generator using optical fiber loops with single-sideband modulation, IEICE Electronics Express, vol. 1(8), p. 217-221, Jul. 2004 (Year: 2004).*
(Continued)

*Primary Examiner* — Bernarr E Gregory
*Assistant Examiner* — Fred H Mull
(74) *Attorney, Agent, or Firm* — Sage Patent Group

(57) ABSTRACT

A receiver (1) for a phased array antenna comprises a laser light source (2) arranged to provide an optical spectrum comprising a first spectral component having a first wavelength and a second spectral component having a second wavelength. The first wavelength is spaced from the second wavelength. A wavelength separator (4) is configured to separate the first spectral component from the second spectral component, such that the first spectral component is directed onto a first path (A) and the second spectral component is directed onto a second path (B). A first delay unit (16) is configured to add a controllable time delay to the first spectral component on the first path. A second delay unit (42) is configured to add the time delay to the second spectral component on the second path. A modulator (14) is configured to modulate the first spectral component on the first path with a received RF signal from the phased array antenna. A heterodyning device (50) is configured to heterodyne the resulting first and second spectral components.

6 Claims, 4 Drawing Sheets

(56) References Cited

U.S. PATENT DOCUMENTS

| | | | |
|---|---|---|---|
| 7,616,850 B1* | 11/2009 | Watts | G02B 6/29338 385/2 |
| 8,761,603 B1 | 6/2014 | Maleki | |
| 2002/0071181 A1* | 6/2002 | Frisken | G02B 27/283 359/484.05 |
| 2003/0165284 A1* | 9/2003 | Takabayashi | H04B 10/2569 385/11 |
| 2008/0075464 A1 | 3/2008 | Maleki et al. | |
| 2010/0046952 A1 | 2/2010 | DeSalvo et al. | |
| 2012/0163501 A1* | 6/2012 | Dong | H04L 27/2096 375/300 |

OTHER PUBLICATIONS

M.R. Fisher, Tunable Optical Group Delay in an Active Waveguide Semiconductor Resonator, IEEE Journal of Selected Topics in Quantum Electronics, vol. 11(1), p. 197-203, Jan./Feb. 2005 (Year: 2005).*

L. Zhuang et al., Single-Chip Ring Resonator-Based 1 – 8 Optical Beam Forming Network in CMOS-Compatible Waveguide Technology, IEEE Photonics Technology Letters, vol. 19(15), p. 1130-1132, Aug. 2007 (Year: 2007).*

M. Tur et al., Photonic Technologies for Antenna Beamforming, Optical Fiber Communication Conference/National Fiber Optic Engineers Conference, Optical Society of America, 2011 (Year: 2011).*

C. Roeloffzen et al., Development of a Broadband Integrated Optical Beamformer for Ku-Band Phased Array Antennas, 34th ESA Antenna Workshop and 2nd Evolutions in Satellite Telecommunication Ground Segments Workshop on Satcom User Terminal Antennas, Noordwijk, The Netherlands, p. 1-8, Oct. 2012 (Year: 2012).*

Roeloffzen, Chris et al., "Development of a Broadband Integrated Optical Beamfomer for Ku-Band Phased Array Antennas", ESTEC, 34th ESA Antenna Workshop and 2nd Evolutions in Satellite Telecommunication Ground Segments Workshop on Satcom User Terminal Antennas, Noordwijk, The Netherlands, Oct. 4, 2012, 1-8.

Scotti, Filippo et al., "Flexible True-Time-Delay Beamforming in a Photonics-Based RF Broadband Signals Generator", IEEE 39th European Conference and Exhibition on Optical Communication, Sep. 22-26, 2013, 1-3.

Tur, Moshe et al., "Photonic Technologies for Antenna Beamforming", IEEE, Optical Fiber Communication Conference and Exposition (OFC/NFOEC), Mar. 6-10, 2011, 1-3.

Zhang, Lin et al., "Analysis and engineering of chromatic dispersion in silicon waveguide bends and ring resonators", Optics Express 8102, vol. 19, No. 9, 2011, 1-6.

Zhuang, L et al., "Single-Chip Ring Resonator-Based 1 x8 Optical Beam Forming Network in CMOS-Compatible Waveguide Technology", IEEE Photonics Technology Letters, vol. 19, No. 15, Aug. 1, 2007, 1130-1132.

* cited by examiner

RECEIVER FOR A PHASED ARRAY ANTENNA

TECHNICAL FIELD

Aspects of the disclosure relate to a receiver for a phased array antenna, and a method of receiving a signal in a receiver for a phased array antenna.

BACKGROUND

Currently, the spectrum allocated for mobile communications corresponds to the Ultra-High Frequencies (UHF) band, laying in the 300 MHz-3 GHz frequency range. This spectrum may in the future not be able to host all the traffic generated inside the mobile networks.

Spectrum in the millimetre-wave band (MMB), a portion of the radiofrequency (RF) spectrum ranging from 3 GHz to 300 GHz, is at present underutilized.

Phased array antennas (PAAs) allow steering of transmitted Radio Frequency (RF) beam without physically moving the antenna. Phased array antennas are used in an increasing number of applications such as multifunctional radars and communications.

It is known for PAAs to use electronic phase shifters at each antenna element to control the viewing angle of the array. For broadband signals, this approach suffers from the squint phenomenon, which causes different frequencies of the RF signal spectrum to aim at a different angle. As is also known, squint can be avoided if the phase shifters are substituted by true-time delays (TTDs).

Recently, pico cells and nano cells have been introduced in order to serve dense populated areas with high data rates and good quality of service. Pico and nano cells, due to their size, increase the possibility of interference between adjacent cells. Beam forming allows the directivity of the radio beam to be controlled in order to minimize disturbances. In beam forming, a radiation lobe is assembled from many similar radiating elements, such as slots or dipoles, each element being individually controlled in phase and amplitude.

Optical beam forming is known, for example from Moshe Tur, Lior Yaron, Oded Raz, "Photonic Technologies for Antenna Beamforming", OSA/OFC/NFOEC 2011, OThA6.pdf. Improved method for optical beam forming are required, for example for use in a cellular radio access network.

SUMMARY

A first aspect of the present disclosure provides a receiver for a phased array antenna comprises a laser light source arranged to provide an optical spectrum comprising a first spectral component having a first wavelength and a second spectral component having a second wavelength. The first wavelength is spaced from the second wavelength. A wavelength separator configured to separate the first spectral component from the second spectral component, such that the first spectral component is directed onto a first path and the second spectral component is directed onto a second path. A first delay unit is configured to add a controllable time delay to the first spectral component on the first path. A second delay unit configured to add the time delay to the second spectral component on the second path. A modulator configured to modulate the first spectral component on the first path with a received RF signal from the phased array antenna. A heterodyning device configured to heterodyne the resulting first and second spectral components.

Thus, an improved receiver for a phase array antenna is provided.

A second aspect of the present disclosure provides a method of operating a receiver for a phased array antenna, comprising: receiving an optical spectrum comprising a first spectral component having a first wavelength and a second spectral component having a second wavelength, wherein the first wavelength is spaced from the second wavelength. The method further comprises separating the first spectral component from the second spectral component, such that the first spectral component is directed onto a first path and the second spectral component is directed onto a second path. The method further comprises adding a controllable time delay to the first spectral component on the first path using a first delay unit, and adding the time delay to the second spectral component on the second path using a second delay unit. The method further comprises modulating the first spectral component on the first path with a received RF signal from the phased array antenna, and heterodyning the resulting first and second spectral components.

A third aspect of the present disclosure provides a computer program product, configured when run on a computer to carry out a method according to any example.

BRIEF DESCRIPTION OF THE DRAWINGS

Embodiments of the present disclosure will now be described, by way of example only, with reference to the accompanying drawings in which.

DETAILED DESCRIPTION

Aspects of the present disclosure relate to receiving one or more RF signals from a phased array antenna. In some aspects, the signals are single RF signals or multiple independent RF signals.

Examples of the disclosure use photonics for independently managing the time delay for each element of an antenna array. This provides for a flexible wideband multiple-signal beamforming.

Figure 1:
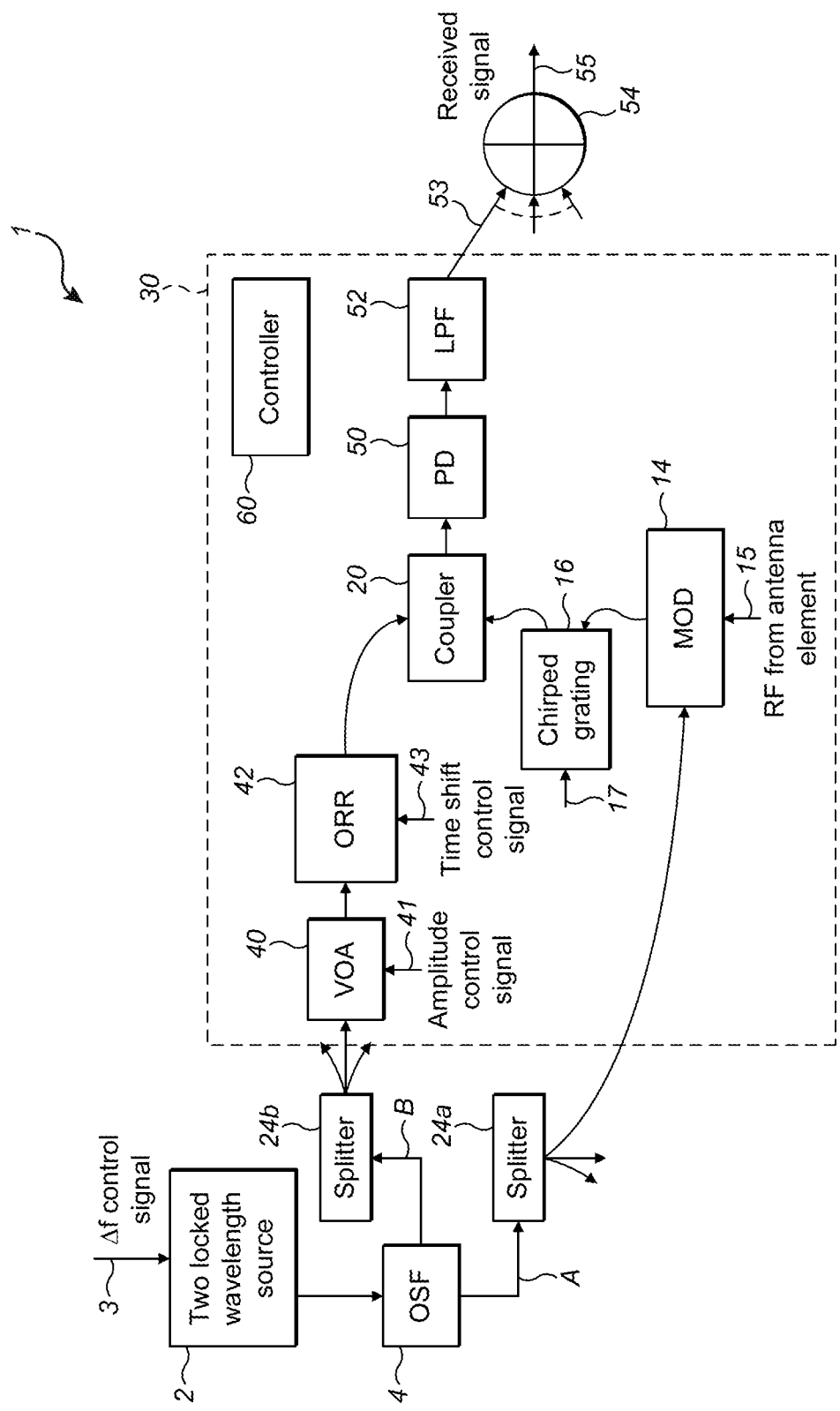
FIG. 1 is schematic illustration of a first example of a receiver according to an example of the disclosure.

FIG. 1 shows a schematic functional diagram of a receiver 1 for a phased array antenna according an example of the disclosure. The receiver 1 is configured to receive radio frequency (RF) signals 15 from a phased array antenna (not shown). In some examples, the RF signal 15 comprises a baseband modulation, for example, corresponding to transmitted data.

The receiver 1 is configured to receive RF signals separately from elements of the antenna. The antenna may be remote from the receiver 1. In some examples, the receiver 1 and antenna of any example may be integrated, co-located, or may be spaced apart.

The receiver 1 receives a laser light from a laser light source providing two or more wavelengths with a fixed wavelength separation. The laser light source may be a part of the receiver 1 (as shown), or may be separate to the receiver. The laser light source may be a mode-locked laser (MLL) 2. The mode-locked laser 2 is configured to generate an optical spectrum comprising a plurality of beams or spectral components having discrete wavelengths. The discrete wavelengths correspond to longitudinal modes of the laser. The modes are separated by a repetition wavelength or frequency. For example, the laser source is a fiber laser, e.g. a fiber mode-locked laser. In some aspects, the laser source of the receiver is the single mode-locked laser only, avoiding a need for multiple lasers or a tunable laser.

The receiver 1 is configured to generate a baseband signal from the beating of a first beam having a first wavelength and a second beam having a second wavelength from the light source 2. The first beam and second beam are controlled in phase. In some examples, the light source is a two wavelength beam source. The first beam may be referred to as a first spectral component, and the second beam may be referred to as a second spectral component.

Since the two beams (wavelengths) are generated from the same reference light source, they are locked. A difference in frequency ($\Delta f$) between the two beams corresponds to the radio signal frequency used by the antenna. The difference in frequency $\Delta f$ is controlled by a control signal 3. In some examples, the difference in frequency is changed by changing the wavelength of only one beam, e.g. the second beam. In this case, the other (e.g. first) wavelength is fixed.

Aspects described provide an effective and cost effective solution for a Phased Array Antenna receiver. An example use of the receiver may be in the mobile networks field. For example, the receiver may be configured to receive RF signals in a radio access network, e.g. the receiver may be a part of a base station. In some examples, the base station provides a femto or pico cell, or is a part of a macro base station.

The first and second beams are separated using a wavelength separator 4. For example, the wavelength separator is an optical selective filter 4. The first beam is transmitted along a path A, and the second beam is transmitted along a path B. In some aspects, each of path A and path B carries one beam, having a single optical wavelength. Paths A and B carry the first and second beams to be processed separately, and then combined, as will be described.

The beam on path A is fed into a splitter 24a, and the beam on path B is fed into a splitter 24b. The splitters 24a,24b are configured to distribute the optical signals to each of a plurality of antenna element units 30. Each antenna element unit 30 is associated with an antenna array element.

Each antenna element unit 30 comprises components for processing the signal associated with an element of the antenna. The receiver comprises a plurality of antenna element units 30, connected to a plurality of elements of the antenna. Only one antenna element unit 30 is shown and described for clarity, the other antenna element units 30 function in the same manner. The antenna element unit 30 separately receives both the first and second beam, i.e. on path A and path B.

The antenna element unit 30 comprises a modulator 14. The modulator 14 is configured to receive the first beam, i.e. is on the first path.

The first wavelength is modulated with the modulator 14. The modulator 14 is an electro-optic modulator. Any type of modulator may be used, e.g. a ring resonator or Mach-Zehnder modulator.

The modulator 14 applies a modulation to the optical signal of the received RF signal from an antenna element. As such, the first wavelength is modulated to carry the received RF signal.

The modulated signals are passed to a first delay unit 16. The first delay unit 16 is configured to provide a time delay to the modulated signal. The time delay is provided according to a chromatic dispersion. The time delay is dependent on the value of the first wavelength of the beam. The time delay provided by the first delay unit 16 is controllable, e.g. by a time shift control signal 17.

In some examples, the first delay unit 16 is a chirped grating. In some aspects, the chirped grating is tunable. For example, the chirped grating may be tuned to a fixed set of frequencies. In some aspects, the chirped grating is arranged to provide a time delay to frequencies in a range around a single wavelength, i.e. the first wavelength. The chirped grating is configured to provide a time delay to the range of frequencies provided by the RF modulation of the first wavelength. In some aspects, the first wavelength is not varied, i.e. is fixed. The chirped grating is able to effectively add a time delay to the range of frequencies around the fixed first wavelength.

The modulated signal of the first beam is filtered with a chirped transfer function response in order to obtain the proper time shifting. A chirp order of the chirped grating is determined such that the spectral component of the modulated first beam is harmonized when beating with the single wavelength phase contribution of the second beam travelling on the other arm of the circuitry.

The chirped grating is configured to be tuned with a temperature control tuning to change the time delay to be added to the modulated signal. The tuning is with the time shift control signal 17. The chirped grating has a broad spectral profile in reflection which shifts with temperature. Temperature tuning the grating results in a change in the location within the grating that the signal is reflected from. If, for example, the optical signal wavelength (first wavelength) is set at the middle of the spectral profile then the temperature can be tuned up and down to reduce and increase the delay. The first wavelength is selected so that the first wavelength remains within the grating profile when tuned. In some examples, the chirped grating covers a set of frequencies and a bandwidth around such frequencies. For a different set of frequencies a different chirped grating is used.

In some examples, the grating is a reflection grating. For example, if the antenna element unit 30 is a photonic integrated device then the grating is a reflective waveguide. If the antenna element unit 30 is built using discrete components, the grating may be a fiber grating.

The delayed and modulated first beam is received by an optical coupler 20. The first path A terminates at the coupler 20.

The second beam on path B is optionally received at an equalizing unit/equalizer 40 configured to equalize the losses among different lines. This provides for the time shifted optical carrier to maintain the same amplitude. In some examples, the equalizing unit 40 is a Voltage controlled Optical Attenuator (VOA). The equalizing unit 40 is placed in front of a second delay unit on the second path B. The equalizing unit 40 is controlled by an amplitude control signal 41.

The equalizing unit 40 is used to compensate for attenuation introduced by the second delay unit (e.g. ORR) when moving around the notch frequency. Around this frequency, the signal amplitude changes in a predictable way and the equalizing unit 40 is used to keep signal amplitude constant inside the antenna element unit.

The antenna element unit 30 further comprises a second delay unit 42. The second delay unit 42 is configured to provide a time delay to the non-modulated signal. The time delay is provided according to a chromatic dispersion. The time delay is dependent on the value of the second wavelength of the beam. The time delay provided by the second delay unit 42 is controllable, e.g. by a time shift control signal 43.

In some examples, the second delay unit 42 is an optical ring resonator (ORR). The ORR is configured to shift the received second beam in time. The ORR provides chromatic dispersion. The second delay unit 42 is controlled and tuned in order to generate a programmable time shift that corresponds to the time shift required to align in time the received signals. The time shift added by the second delay unit 42 is controlled to be equal to the time shift added by the first delay unit 16.

The time shift provided by the ORR is generated in a known manner by heating of the ORR. The wavelength of the time shifted optical beam (i.e. second wavelength) is arranged to be close to the resonance frequency of the ORR. This may be achieved by control of the second wavelength and/or tuning of the ORR. This provides for an increased value of group delay, without the need to cascade several ring resonators to cumulate further chromatic dispersion. The antenna element unit 30 comprises only a single ORR. In particular, the second delay unit 42 comprises only a single ORR. In this case, there is only a single ORR on the second path, i.e. the only controllable time delay is due to the single ORR. The single ORR is able to provide a time delay which is sufficiently large for operation of the receiver 1, due to the second wavelength being at or close to the resonance frequency of the ORR.

The wavelength of the time shifted optical beam (i.e. second wavelength) at or close to the resonance frequency of the ORR is possible because the second wavelength is not modulated. The modulating signal can be distorted by the notch response of the ring at the resonating frequency. The receiver 1 described avoids this distortion issue by locating the ORR 42 on a separate path (path B) to the path (path A) on which the light beam is modulated.

The relatively small size of the second delay unit 42, and first delay unit 16, allows for a better control of temperature. For example, the temperature is more stable. The first delay unit 16 and second delay unit 42 each comprise only one time delay element (ORR or chirped grating).

The ORR can be tuned to any frequency in the full range of frequencies. The ORR then provides a narrow bandwidth around the central frequency, due to nonlinearity of the single device. This is in contrast to the chirped grating which operates at a specific set of frequencies, but in some examples is not be able to be tuned to receive the full range of RF frequencies required.

The resonant frequency of the ORR is controlled by a resonant frequency control signal (not shown). The resonant frequency is controlled according to the second wavelength. The resonant frequency is controlled to be substantially equal to the second wavelength. The control of the resonant frequency and time delay of the ORR is described in more detail with respect to FIG. 3.

In this example, the first delay unit 16 and second delay unit 42 are different components (i.e. chirped grating and ORR). The first and second light beams which are delayed by the first delay unit 16 and second delay unit 42 are also different on the different paths (modulated and not modulated). This allows the selection of component(s) used for the first delay unit 16 and second delay unit 42 to be optimized for the respective function. This allows a performance and/or cost improvement.

The wavelength positioning of the time shifted carrier close to the resonance frequency of the ORR may generate additional losses, compared to a wavelength further from the resonance frequency. The additional losses are mitigated by use of direct detection of the resulting beating signal (as described below), resulting from the optical coupling of the first and second beams (modulated and shifted carrier signals).

The wavelength distance between the second wavelength and the ORR resonance frequency is a function of the delay to be introduced and the design characteristics of the ORR.

The second beam, including time delay, is output from the second delay unit 42 to the coupler 20. The coupler 20 optically combines the first and second beams.

The coupler 20 provides the first and second beams to a heterodyning device 50. In some examples, the heterodyning device 50 is a photodiode. The first and second beams are heterodyned by the heterodyning device 50. The heterodyning device 50 provides mixing of spectral components of the first and second beams. The heterodyning device 50 may be considered as a photodetector.

The heterodyning device 50 is configured for optical heterodyne detection. The first and second beams of the optical signal are mixed by impinging together on the surface of the heterodyning device 50. The heterodyning device 50 provides for direct detection. The heterodyning device 50 is configured to provide the baseband signal received in the RF signal at the phased array antenna.

The heterodyning device 50 is configured to output a spectrum including the difference or beatings between the first and second beams. The heterodyning device 50 is configured to heterodyne the resultant first and second spectral components, i.e. heterodyne the first and second spectral components as controllably time delayed and the first spectral component as modulated, as described. The first and second wavelengths are selected to have a frequency difference which is substantially equal to a frequency of the RF signal 15 received from the antenna element. The difference in the first wavelength (including RF modulation) and second wavelength is a baseband signal. The heterodyning device 50 brings the first and second beams from the optical domain into a baseband signal. The baseband signal output by the heterodyning device 50 corresponds to a baseband modulation of the RF signal 15 received by the antenna element. With a Δf between the two locked wavelengths source equal to the received RF signal 15 frequency, the signal 53 is directly the baseband signal.

When the time shifted carrier (second beam) and modulated signals (first beam) beat together the resulting signal is time shifted and not phase shifted. This reduces the effect of the squint phenomenon. The broad spectral intensity and phase profile of the chirped grating 16 can be matched with the trend of each frequency in the modulated signal bandwidth. This provides for introducing a proper time shift also among the harmonics of the modulated signals travelling toward different elements of the RF antenna array.

The heterodyning device 50 outputs a plurality of frequencies resulting from the mixing to a filter 52. The filter 52 is configured to pass the baseband signal 53. For example, the filter 52 is a Low Pass Filter. The low pass filter is used to filter out high frequencies.

The receiver 1 is configured to combine the signal 53 output from each antenna element unit 30. The signal 53 from each antenna element unit 30 is fed into a single combiner 54. The combiner 54 is configured to sum the signals 53 from each antenna element unit 30. The combiner 54 outputs the complete signal 55 from all antenna elements. Thus, the receiver 1 provides for receive beamforming.

The antenna element units 30 are implemented as photonic integrated circuitry. For example, the components described are implemented on a silicon photonics chip. In some examples, discrete components are used for the parts outside of the antenna element units 30.

The receiver 1 is able to integrate the functionalities needed to generate and control in real time the modulated and time shifted signals for a PAA receiver in an integrated photonic device. The receiver 1 is configured to remove or reduce constraints on the RF frequency range and resolution, on the total delay span, and on the delay minimum resolution. This allows a full control of the radio-beam orientation in a precise and flexible way.

The receiver 1 provides a cost effective and feasible solution for an optical based Phased Array Antenna receiver. This is of particular advantage when using beamforming in a mobile network. For example, the receiver 1 may be used small cells, e.g. in nano and pico cells. For such small cells, a large number of devices need to be used, and costs, footprint and power consumption of the device should be the lowest possible.

The example of the laser light source described above is a mode locked laser. Any other technique able to generate two different wavelengths which are phase locked and have a precise frequency difference may be used.

An aspect of the disclosure is the intensity setting for the modulated signal in order to generate a proper beating signal. This enables the counteraction of the additional losses experienced by the time shift carrier (second beam) due to operating at or close to the resonance frequency. The receiver 1 may be considered as defining a propagating electrical field in the photonic circuitry, the result of the beating between the second beam (time shift beam) and the first beam (modulated beam).

If the modulated and not modulated signals are represented as:

$$S(t)=E_s(t)\cos(\omega_s t+\varphi_s)$$

$$P(t)=E_p\cos(\omega_p t+\varphi_p)$$

with $E_s(t)$ representing the modulating signal 15 of the form $E_s(t)=a\cdot x(t)$.

the current intensity at the heterodyning device 50 (photodetector) is $$I \propto \frac{|E_s(t)|^2 + E_p^2}{2} + \frac{|E_s(t)|^2}{2}\cos(2\omega_s t + 2\varphi_s) + \frac{E_p^2}{2}\cos(2\omega_p t) + E_s(t)E_p\cos[(\omega_s+\omega_p)t+\varphi] + E_s(t)E_p\cos[(\omega_s-\omega_p)t+\varphi]$$

with $\varphi=(\omega_s-\omega_p)\Delta t$ where $\Delta t$ is the time shift introduced by the first delay unit 16 (and by the second delay unit 42).

Filtering out baseband and high frequency components the following term remains:

$$E_s(t)E_p\cos\lfloor(\omega_s-\omega_p)t+\varphi\rfloor$$

A baseband signal will be generated if $\omega_s$ and $\omega_p$ are chosen equal. The filter 52 is used to remove spectral components at $2*(\omega_s-\omega_p)$ created by the beating.

Regulating the amplitude "a" of the modulation, it is possible to compensate the amplitude reduction of the second beam (not modulated signal), when passing through the VOA 40 and second delay unit 42, in order to keep the signal level constant. In this example, a level of the first beam is modified, as indicated by the amplitude "a", e.g. at a fixed wavelength. This may increase the overall signal obtained after the heterodyning (beating).

The chain of the equalizing unit 40 and second delay unit (VOA-ORR) introduces a loss that is kept stable by the VOA. If the stable overall loss is too high, this can be compensated by the amplitude of the wavelength on the first branch. This can be seen from the signal output from the filter 52, in which heterodyning produces a signal with magnitude based on $E_p$ multiplied $E_s(t)$.

The chromatic dispersion of the optical ring resonator follows a specific profile that is function of the signal 17 driving the optical ring resonator. The time shift control signal may be a voltage signal. The response characteristic of the ORR to the voltage signal 43 is not linear. A proper control signal 43 is generated as a function of the $\Delta t$ required. The attenuation of the optical ring resonator changes when moving from one $\Delta t$ value to another with a precise and known behavior. The signal 41 (e.g. voltage signal) is used to drive in a coordinated manner the VOA 40 in order to equalize the total delay to a predefined value. This provides for a stable amplitude of the electrical signal generated at the output of the photodiode 50.

The time shift control signal 17 is configured to generate the same time delay in the first delay unit 16 as the time shift control signal 43 generates in the second delay unit 42. The time shift control signal 17 and time shift control signal 43 may be different, in for example, due to the different responses of the first delay unit 16 and second delay unit 42. For example, the time shift control signal 17 and time shift control signal 43 may be different due to the different components used for the first delay unit 16 and second delay unit 42 (i.e. chirped grating and ORR).

In an alternative example, the second time delay unit 42 is a chirped grating (instead of the ORR described above). In this case, each modulated optical flow feeds a separate chirped grating that is used as a True Time Delay (TTD) element.

The receiver 1 is an integrated optical based device which functions as a beamforming receiver. The arrangement described exploits the use of optical true time delay generated by chirped grating and ORR elements to effectively align the RF signals received by the different antenna element. By beating a time shifted optical carrier with a time shifted one modulated with the RF signal for each antenna element, baseband signals which are properly aligned in time can be provided. The sum of the baseband signals from all of the used antenna elements provides the reconstructed received baseband signal.

The phased array antenna may alternatively be referred to as a phased array. The phased array may be considered as comprising a plurality of antennas (i.e. described above using the term 'element').

The receiver comprises, or is connected to, a controller 60 configured to generate the control signals described to the first and second delay units. The controller 60 comprises a processing arrangement and memory. The controller is configured to run a computer program, for example provided on a computer program product, to control the functioning of the receiver 1 as described. In some examples, the controller 60 is further configured to generate the control signal 3 to control the frequency difference of the light source. In some examples, the controller 60 is further configured to generate the control signal 41 to control the equalizing unit 40.

Figure 2:
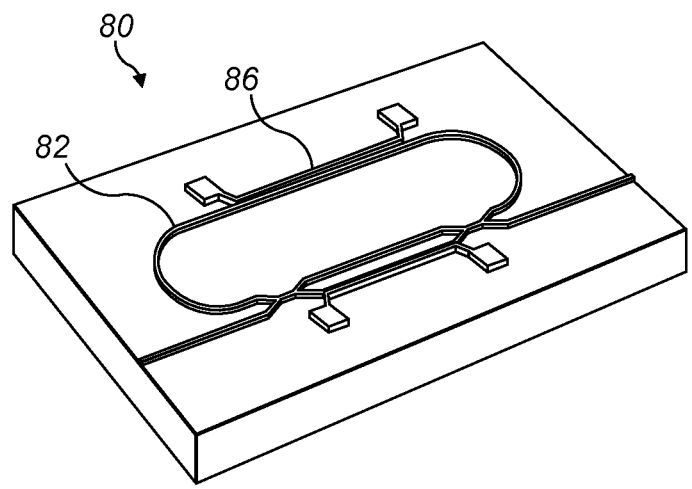
FIG. 2 is an illustration of an optical ring resonator used as a part of the receiver.

FIG. 2 shows an example of an optical ring resonator 80, for example as included in the receiver 1 as the second delay unit 42. The optical ring resonator 80 comprises am optical waveguide in the form of a ring 82 or loop into which light is coupled. The optical ring resonator 80 is tunable by controlling one or more heaters.

In an example, the optical ring resonator 80 comprises a tunable coupler to change coupling to the ring. The tunable coupler is controlled by a heater 86 configured to adjust heating of the coupler. The heater 86 controls an amount of time delay (group delay) provided by the optical ring resonator 80.

In an example, the optical ring resonator 80 comprises a tunable phase shifter to change the resonance frequency of the optical ring resonator 80. The tunable phase shifter is controlled by the heater 86 configured to adjust heating of the phase shifter. The heater 86 controls the resonance frequency.

Figure 3:
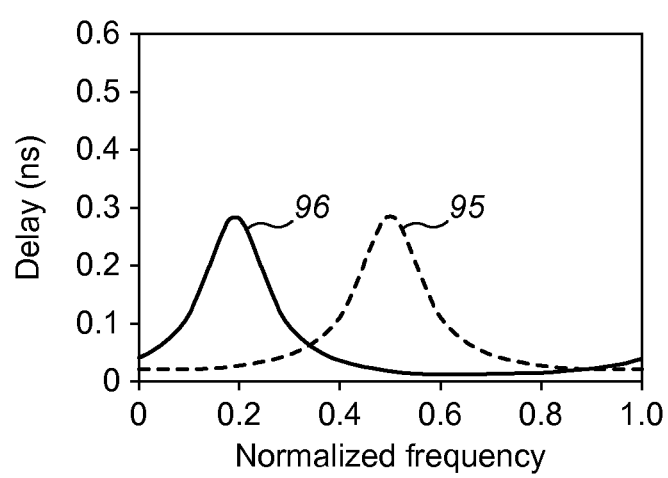
FIG. 3 illustrates a variation in the amount of delay and central frequency are generated by the optical ring resonator.

FIG. 3 shows examples of the variation in resonance frequency with temperature, as controlled by the heater 86. For two temperatures 95,96, different resonant frequencies are shown at the peaks. Both delay and central frequency can be moved with temperature depending on the amount of the variation of temperature.

In this example, there is a variation in time delay and central frequency with temperature. Both delay and central frequency can be moved with temperature, i.e. dependent on the temperature.

Figure 4:
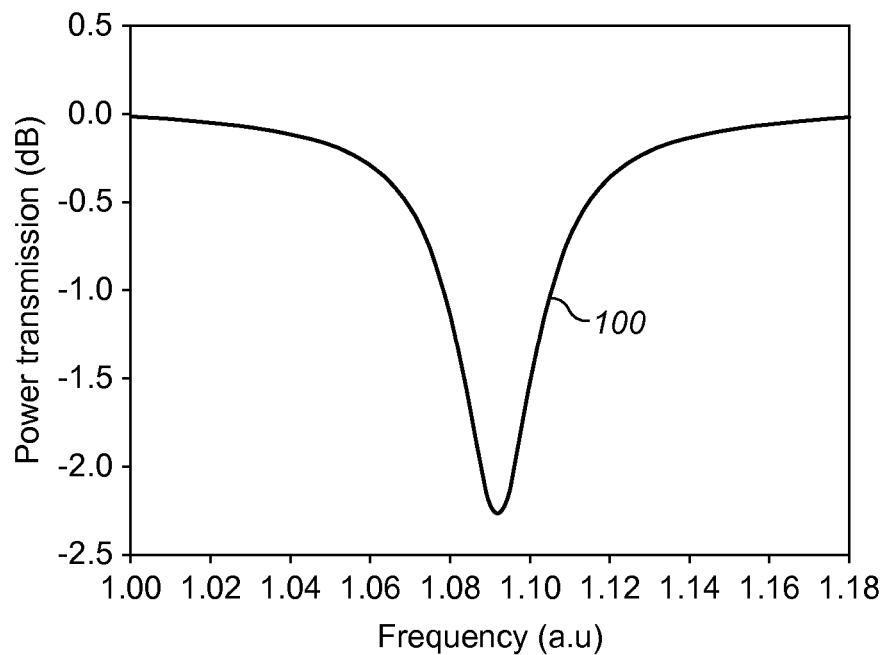
FIG. 4 illustrates a power transmission by the optical ring resonator.

FIG. 4 shows an example transmission characteristic 100 of an optical ring resonator 80. The transmission characteristic 100 is a power transmission loss, in this case measured in dB. At the resonant frequency, at approximately 1.09 arbitrary units (a.u.), a maximum power loss is shown.

Figure 5:
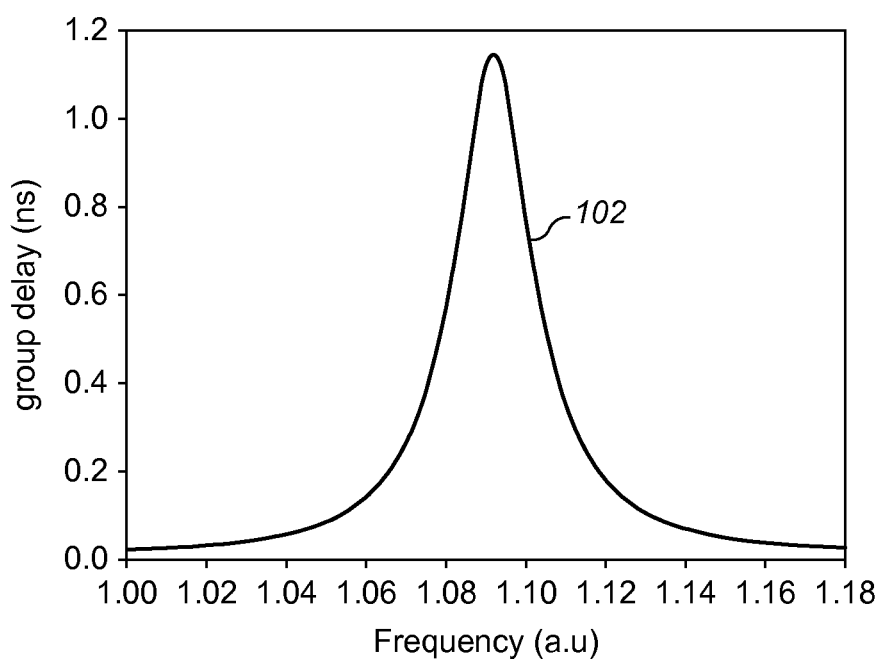
FIG. 5 illustrates a variation in the amount of delay generated by the optical ring resonator with frequency.

FIG. 5 shows an example of how time delay (group delay) 102 of the optical ring resonator 80 varies with frequency. At the resonant frequency, at approximately 1.09 arbitrary units (a.u.), a maximum delay is shown. In aspects of the disclosure, the second delay unit 42 (i.e. ORR) is tuned such that the resonant frequency is at or close to the second wavelength. Thus, the ORR is arranged to operate in a high group delay and high power loss configuration.

In some examples, the resonance frequency is spaced from the wavelength in order that the wavelength is on aside of the curve shown, in a position providing the desired delay. The resonance frequency may be selectable to provide the maximum delay possible.

Figure 6:
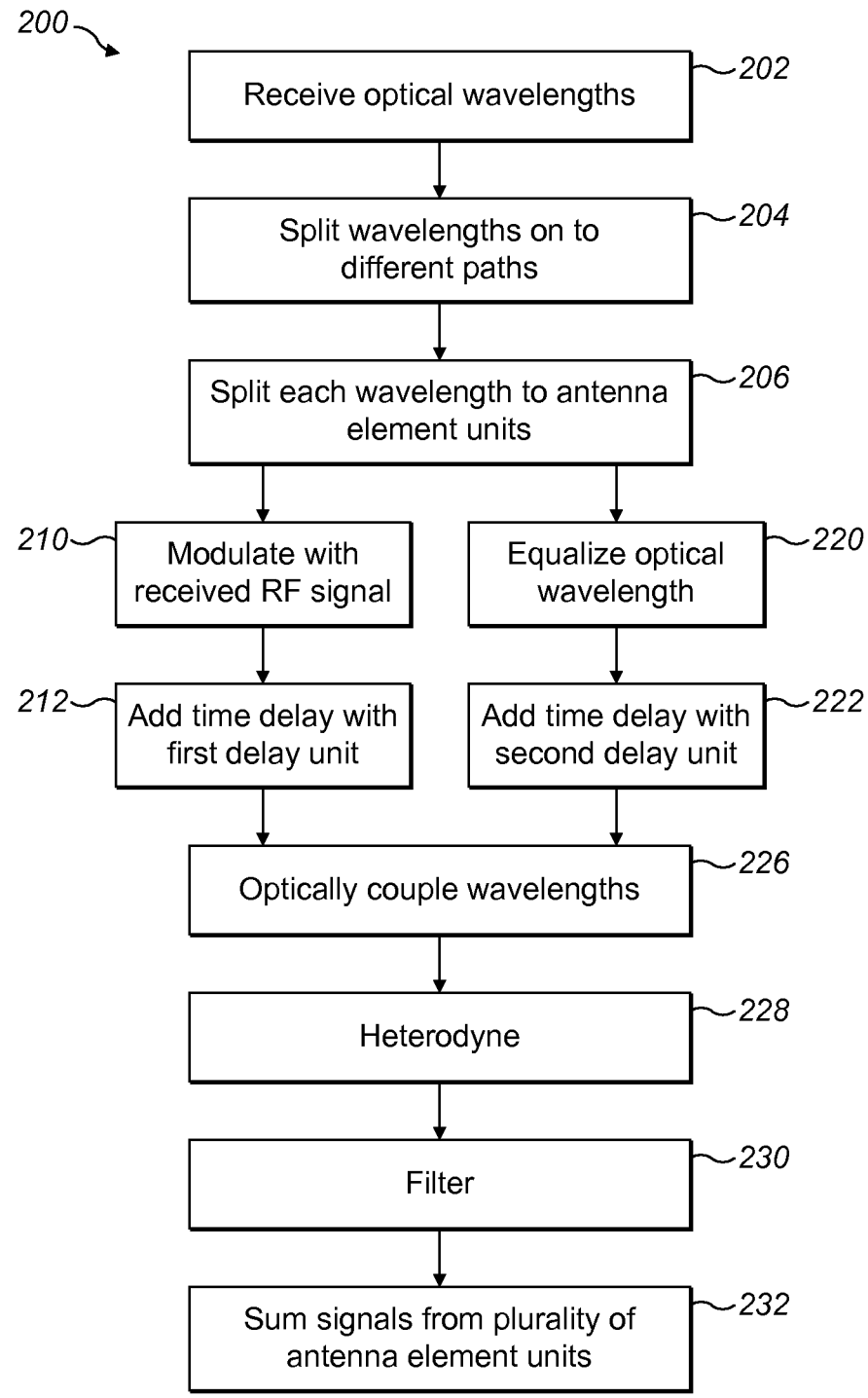
FIG. 6 is a method according to an aspect of the present disclosure.

FIG. 6 illustrates an example method 200 for operating the receiver 1.

In 202, optical wavelengths or spectral components are received. The receiving of the optical wavelengths may comprise generating the optical wavelengths and/or controlling a frequency difference between the wavelengths.

In 204, a first and a second spectral component of different wavelengths are split apart or separated to follow different paths through a part of the receiver 1. For example, the first and second wavelengths are output from different ports of an OSF 4.

In 206, the spectral components of each of the first and second wavelengths are distributed to a plurality of the antenna element units. This allows each antenna element unit, separately processing the received RF signals from an antenna element, to receive the same locked first and second wavelengths.

In 210, on the first path, the first spectral component is modulated with the received RF signals from an antenna element.

In 212, a time delay is added to the modulated first spectral component.

In 220 and 222, the second spectral component is processed in parallel to the first spectral component. In 220, second spectral component is equalized.

In 222, a time delay is added to the second spectral component. In some aspects, the time delay is the same. The time delay is added by a different type of component to the first and second spectral component. The time delay is added by the second delay unit, e.g. ORR. The ORR delays the non-modulated signal (second wavelength), and not the modulated signal (first wavelength).

In 226, the first and second spectral components are optically coupled together again. This terminates the separate paths A and B.

In 228, the first and second spectral components are heterodyned. For example, this is by a photodiode.

In 230, the signals of interest (e.g. at baseband) are filtered by a filter 52.

In 232, signals from a plurality of antenna element units are summed together. This forms the receive beam.

The receiver 1 is described as splitting wavelengths from a single light source onto different paths A and B, and then splitting each wavelength to the plurality of antenna element units 30. Alternatively, the first and second wavelengths are split to each antenna element unit 30, and then the first and second wavelengths separated at each antenna element unit 30 onto the different paths A and B.

The invention claimed is:

1. A receiver for a phased array antenna, comprising:
    a laser light source arranged to provide an optical spectrum comprising a first spectral component having a first wavelength and a second spectral component having a second wavelength, wherein the first wavelength is spaced from the second wavelength;
    a wavelength separator configured to separate the first spectral component from the second spectral component, such that the first spectral component is directed onto a first path and the second spectral component is directed onto a second path;
    a first delay unit configured to add a controllable time delay to the first spectral component on the first path;
    a second delay unit configured to add the time delay to the second spectral component on the second path, the second delay unit comprises a single optical ring resonator;
    a modulator configured to modulate the first spectral component on the first path with a received RF signal from the phased array antenna;
    a heterodyning device configured to heterodyne the resulting first and second spectral components; and
    a controller configured to control a resonant frequency of the single optical ring resonator based on the second wavelength, such that the single optical ring resonator provides the time delay to the second spectral component on the second path, wherein the second spectral component is non-modulated,
    an equalizer unit configured to compensate for attenuation introduced by the second delay unit when controlling the resonance frequency of the single optical ring resonator;
    wherein the first delay unit and/or the second delay unit are tunable to control the time delay.

2. The receiver of claim 1, wherein a same time delay is generated by the first delay unit and the second delay unit.

3. The receiver of claim 1, wherein at least the first delay unit and second delay unit are a part of a photonic integrated circuit.

4. The receiver of claim 1, wherein the received RF signal comprises a baseband modulation, and the heterodyning device is configured to output a baseband signal corresponding to the baseband modulation.

5. The receiver of claim 1, wherein the receiver comprises a plurality of antenna element units, each antenna element units configured to receive a RF signal from an element of the phased array antenna, wherein each antenna element unit comprises a said first delay unit, a said second delay unit, a said modulator and a said heterodyning device.

6. A method of operating a receiver for a phased array antenna, the receiver comprising a controller configured to control a time delay, the method comprising:
  receiving an optical spectrum comprising a first spectral component having a first wavelength and a second spectral component having a second wavelength, wherein the first wavelength is spaced from the second wavelength;
  separating the first spectral component from the second spectral component, such that the first spectral component is directed onto a first path and the second spectral component is directed onto a second path;
  adding a controllable time delay to the first spectral component on the first path using a first delay unit;
  adding the time delay to the second spectral component on the second path using a second delay unit, wherein the second delay unit comprises a single optical ring resonator;
  modulating the first spectral component on the first path with a received RF signal from the phased array antenna;
  heterodyning the resulting first and second spectral components; and
  controlling a resonant frequency of the single optical ring resonator based on the second wavelength, such that the single optical ring resonator provides the time delay to the second spectral component on the second path, wherein the second spectral component is non-modulated,
  compensating for attenuation introduced by the second delay unit when controlling the resonance frequency of the single optical ring resonator;
  wherein the first delay unit and/or the second delay unit are tunable to control the time delay.

* * * * *